Oct. 17, 1933.  I. F. KEPLER  1,931,322
SPLICED BELT AND METHOD OF SPLICING THE SAME
Filed Aug. 14, 1930
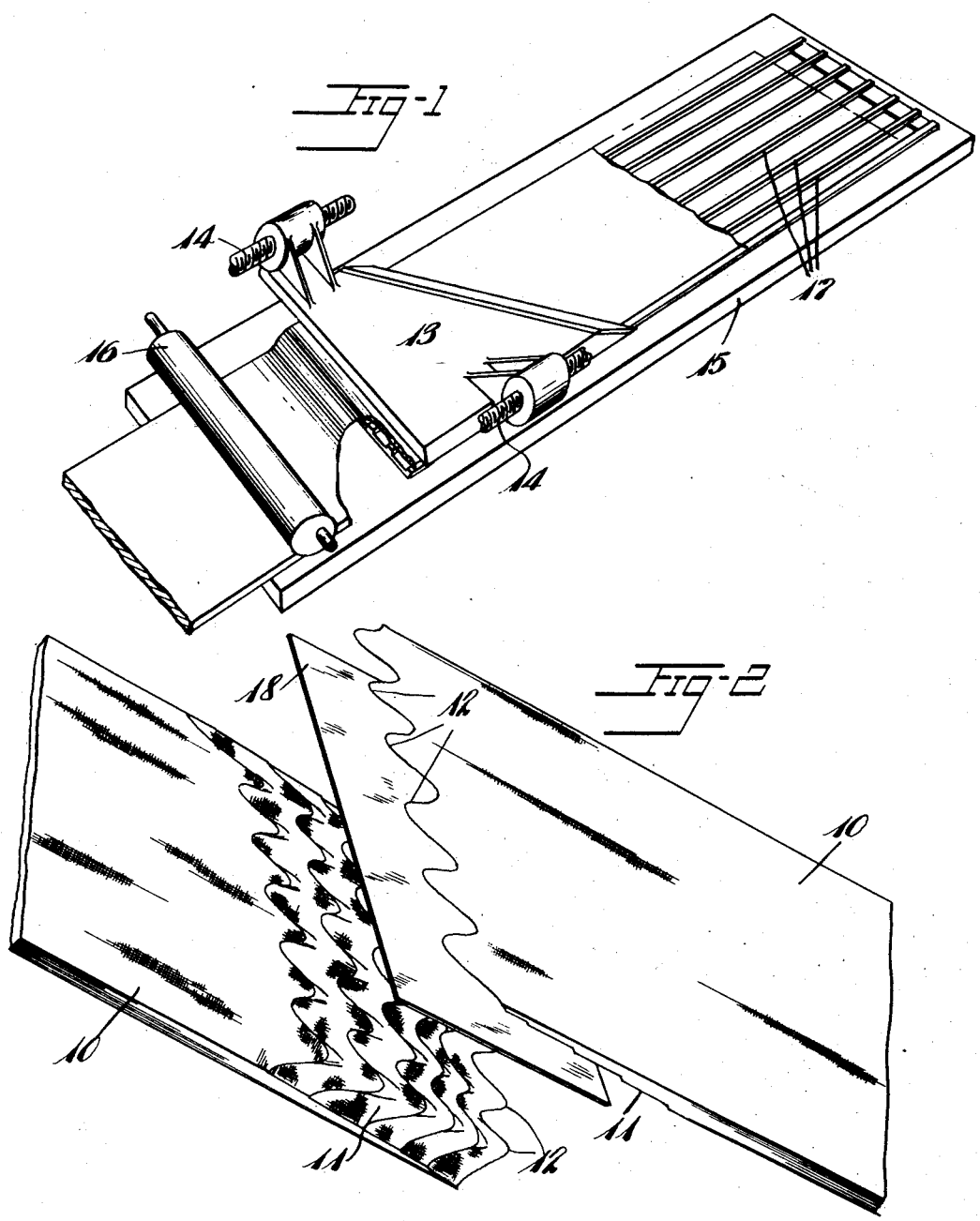

Patented Oct. 17, 1933

1,931,322

UNITED STATES PATENT OFFICE 1,931,322

SPLICED BELT AND METHOD OF SPLICING THE SAME

Irwin F. Kepler, Akron, Ohio, assignor to The B. F. Goodrich Company, New York, N. Y., a corporation of New York Application August 14, 1930. Serial No. 475,366

13 Claims. (Cl. 24—38)

This invention relates to spliced belts and to methods of splicing the same, and more especially it relates to the splicing of laminated belts such as, for example, belts comprising a plurality of fabric plies, bounded together with a suitable binder of flexible material, such as rubber.

The chief objects of the invention are to provide an improved splice in a transmission or conveyor belt, and to provide an improved method of making said splice. A more specific object is to provide greater flexibility and durability in a skived belt-splice. Other objects will be manifest.

Of the accompanying drawing:

Fig. 1 is a fragmentary perspective view of apparatus adapted for the practice of my invention, in its preferred form.

Fig. 2 is a perspective view of two skived belt-ends showing the manner of joining them in a splice.

In this invention the belt-ends are prepared for splicing by being skived or beveled, and the beveled faces are thereafter brought into face to face relation, with an intervening layer of unvulcanized rubber composition, and vulcanized together. The splice subsequently may be reinforced with stitching if desired.

The first step of my improved method consists of skiving the belt-ends, so that the skived faces, as will be observed with reference to Fig. 2, are disposed somewhat obliquely in the cross-section of the belt. The skived faces also follow a wavy or undulating course transversely of the belt-ends to produce a scarfed effect, with the result that the end of each fabric ply and the ends of the belts are serrated, substantially as shown. In Fig. 2 the belts are designated 10, 10, the skived portions 11, 11, and serrated belt-ends 12, 12.

The skiving of the belt-ends is effected in apparatus such as is shown in Fig. 1, said apparatus comprising a reciprocable knife 13 mounted for movement longitudinally of a belt 10, the cutting edge of the knife being disposed obliquely with relation to the work, and suitable means, such as the feed-screws 14, 14 being provided for impelling the knife. The belt 10 is supported upon a table 15 which is inclined longitudinally with relation to the course of the knife, to effect the skiving of the belt, the knife, by reason of the oblique disposition of its cutting edge, being adapted to produce a cut beveled longitudinally and transversely of the belt, and an eccentric 16 or other suitable device is provided for holding the belt against movement with relation to the table. For skiving a mating belt-end complementally a device comprising a knife having an oblique cutting edge with its left end instead of its right end in advance may be used.

For producing the scarfed effect on the skive, a relatively thin metal or cardboard grid 17 is mounted upon the table 15 with its longitudinal elements extending lengthwise of the work, beneath the same. The arrangement is such that as the knife 13 bears upon the belt-end in severing the same, and presses it against the underlying grid 17, the belt is deformed by the latter so as to present a wavy structure transversely of the belt, so that the knife skives the belt in such a manner that it presents the scarfed effect described, when it is subsequently removed from the skiving device and laid flat. The scarfs may be made complemental by cutting one of the belt-ends with the grid offset one-half of a spacing from the relative position in which it is used for the cutting of the other belt-end.

Although preferable, it is not required that the scarfing of the respective belt-ends be complemental, since the use of the intervening layer of rubber 18, between the belt-ends, compensates for mis-matching of the scarfs and of the serrations of the belt-ply-ends, and produces a unitary structure at the splice which is strong and flexible.

The oblique arrangement of the splice and the serrated condition of the ends of the respective belt-plies avoid stiffness of the elements adjacent their termini such as would start separation in the flexing of the belt around a pulley, and the scarfing not only provides the serrations but also provides a large surface area for adhesion to the bonding rubber.

Modifications may be resorted to within the scope of the appended claims, as I do not limit my claims wholly to the specific construction shown or exact procedure described.

I claim:

1. A belt having a splice therein, said splice having a portion thereof disposed non-straight and obliquely in the cross-section of the belt.

2. A belt comprising two belt-ends spliced together, the opposed faces of the belt ends being grooved and having their ends at different positions longitudinally of the belt.

3. A laminated belt having a splice therein, a plurality of plies of the belt, at the splice, having their ends at different positions longitudinally of the belt and provided on their opposed faces with ridges and grooves.

4. A belt as defined in claim 3 in which the ridges and grooves of the belt-plies, in respective belt-ends, are non-complemental, and the splice includes a cementitious material between the belt ends.

5. A belt comprising two beveled belt ends spliced together the faces of the bevels being grooved and opposed in the splice.

6. A belt comprising two longitudinally grooved belt ends spliced together, the grooves having side walls sloping toward a face of the belt.

7. A belt comprising two beveled and scarfed belt-ends spliced together, the faces of the bevels being grooved and opposed.

8. A belt comprising two belt-ends scarfed non-complementally and held together by an intervening layer of cementitious material.

9. A belt comprising two belt-ends scarfed non-complementally and beveled longitudinally and transversely and having a cementitious material therebetween.

10. The method of splicing a belt which comprises concurrently skiving and scarfing respective belt-ends, and then joining them in a splice.

11. A method as defined in claim 10 in which the belt-ends are skived longitudinally and transversely and scarfed longitudinally.

12. The method of splicing a belt which comprises distorting the respective belt-ends to provide longitudinal ridges and depressions therein, skiving the belt-ends while they are so distorted, and then uniting the skived ends in a splice.

13. The method of splicing a belt which comprises scarfing respective belt-ends, assembling the same in face to face relation upon an intervening layer of unvulcanized rubber, and then vulcanizing the latter to provide a unitary spliced structure.

IRWIN F. KEPLER.